US008607014B2

(12) United States Patent
Spatscheck et al.

(10) Patent No.: US 8,607,014 B2
(45) Date of Patent: Dec. 10, 2013

(54) MULTI-AUTONOMOUS SYSTEM ANYCAST CONTENT DELIVERY NETWORK

(75) Inventors: Oliver Spatscheck, Randolph, NJ (US); Zakaria Al-Qudah, Florham Park, NJ (US); Seunjoon Lee, Basking Ridge, NJ (US); Michael Rabinovich, Solon, OH (US); Jacobus Van der Merwe, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 428 days.

(21) Appl. No.: 12/645,000

(22) Filed: Dec. 22, 2009

(65) Prior Publication Data

US 2011/0153941 A1    Jun. 23, 2011

(51) Int. Cl.
*G06F 12/00* (2006.01)
*G06F 13/00* (2006.01)
*G06F 13/28* (2006.01)
*G06F 15/173* (2006.01)
*G06F 15/16* (2006.01)

(52) U.S. Cl.
USPC ........... 711/165; 711/154; 709/224; 709/226; 709/229; 709/238

(58) Field of Classification Search
USPC ........... 711/154, 165; 709/224, 226, 229, 238
See application file for complete search history.

(56) References Cited

U.S. PATENT DOCUMENTS

| | | | |
|---|---|---|---|
| 6,785,704 | B1 | 8/2004 | McCanne |
| 6,920,129 | B2 | 7/2005 | Preston et al. |
| 7,047,315 | B1 | 5/2006 | Srivastava |
| 7,088,718 | B1 | 8/2006 | Srivastava |
| 7,254,138 | B2 | 8/2007 | Sandstrom |
| 7,328,009 | B2 | 2/2008 | Takeda et al. |
| 7,330,906 | B2 | 2/2008 | Hameleers et al. |
| 7,343,422 | B2 | 3/2008 | Garcia-Luna Aceves et al. |
| 7,574,499 | B1 * | 8/2009 | Swildens et al. .............. 709/223 |
| 2003/0079027 | A1 | 4/2003 | Slocombe et al. |

(Continued)

OTHER PUBLICATIONS

"Anycast CDNs Revisited," Hussein et al., Case Western Reserve University, Cleveland, OH, AT&T Labs—Research, Florham Park, NJ 07932, WWW 2008, Beijing, China, Apr. 21-25, 2008, pp. 277-286.

(Continued)

*Primary Examiner* — Michael Alsip
(74) *Attorney, Agent, or Firm* — Akerman Senterfitt; Michael K. Dixon; Roy Zachariah

(57) ABSTRACT

A content delivery network includes first and second sets of cache servers, a domain name server, and an anycast island controller. The first set of cache servers is hosted by a first autonomous system and the second set of cache servers is hosted by a second autonomous system. The cache servers are configured to respond to an anycast address for the content delivery network, to receive a request for content from a client system, and provide the content to the client system. The first and second autonomous systems are configured to balance the load across the first and second sets of cache servers, respectively. The domain name server is configured to receive a request from a requestor for a cache server address, and provide the anycast address to the requestor in response to the request. The anycast island controller is configured to receive load information from each of the cache servers, determine an amount of requests to transfer from the first autonomous system to the second autonomous system; send an instruction to the first autonomous system to transfer the amount of requests to the second autonomous system.

20 Claims, 7 Drawing Sheets

(56) References Cited

U.S. PATENT DOCUMENTS

| | | |
|---|---|---|
| 2004/0165565 A1 | 8/2004 | Omae et al. |
| 2005/0010653 A1* | 1/2005 | McCanne .................... 709/219 |
| 2005/0044141 A1 | 2/2005 | Hameleers et al. |
| 2005/0149531 A1 | 7/2005 | Srivastava |
| 2005/0164729 A1 | 7/2005 | Narayanan et al. |
| 2005/0198367 A1 | 9/2005 | Ettikan |
| 2006/0018299 A1 | 1/2006 | Yamamoto |
| 2006/0018317 A1 | 1/2006 | Jimmei |
| 2006/0130064 A1 | 6/2006 | Srivastava |
| 2006/0193252 A1 | 8/2006 | Naseh et al. |
| 2006/0209885 A1 | 9/2006 | Hain et al. |
| 2006/0221866 A1 | 10/2006 | Shepherd |
| 2006/0236394 A1 | 10/2006 | Morrow et al. |
| 2007/0088708 A1 | 4/2007 | R. |
| 2007/0133539 A1 | 6/2007 | Kang et al. |
| 2007/0165532 A1* | 7/2007 | Retana et al. ................. 370/241 |
| 2007/0243821 A1 | 10/2007 | Hundscheidt et al. |
| 2008/0080513 A1 | 4/2008 | Kang et al. |
| 2008/0123640 A1 | 5/2008 | Bhatia et al. |
| 2008/0126529 A1 | 5/2008 | Kim et al. |
| 2008/0235400 A1* | 9/2008 | Slocombe et al. ............ 709/245 |
| 2009/0113057 A1* | 4/2009 | Van der Merwe et al. .... 709/227 |
| 2009/0292824 A1* | 11/2009 | Marashi et al. ............... 709/247 |

OTHER PUBLICATIONS

U.S. Appl. No. 12/268,744, filed Nov. 11, 2008.

* cited by examiner

MULTI-AUTONOMOUS SYSTEM ANYCAST CONTENT DELIVERY NETWORK

FIELD OF THE DISCLOSURE

The present disclosure generally relates to communications networks, and more particularly relates to a multi-autonomous system (AS) anycast content delivery network (CDN).

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
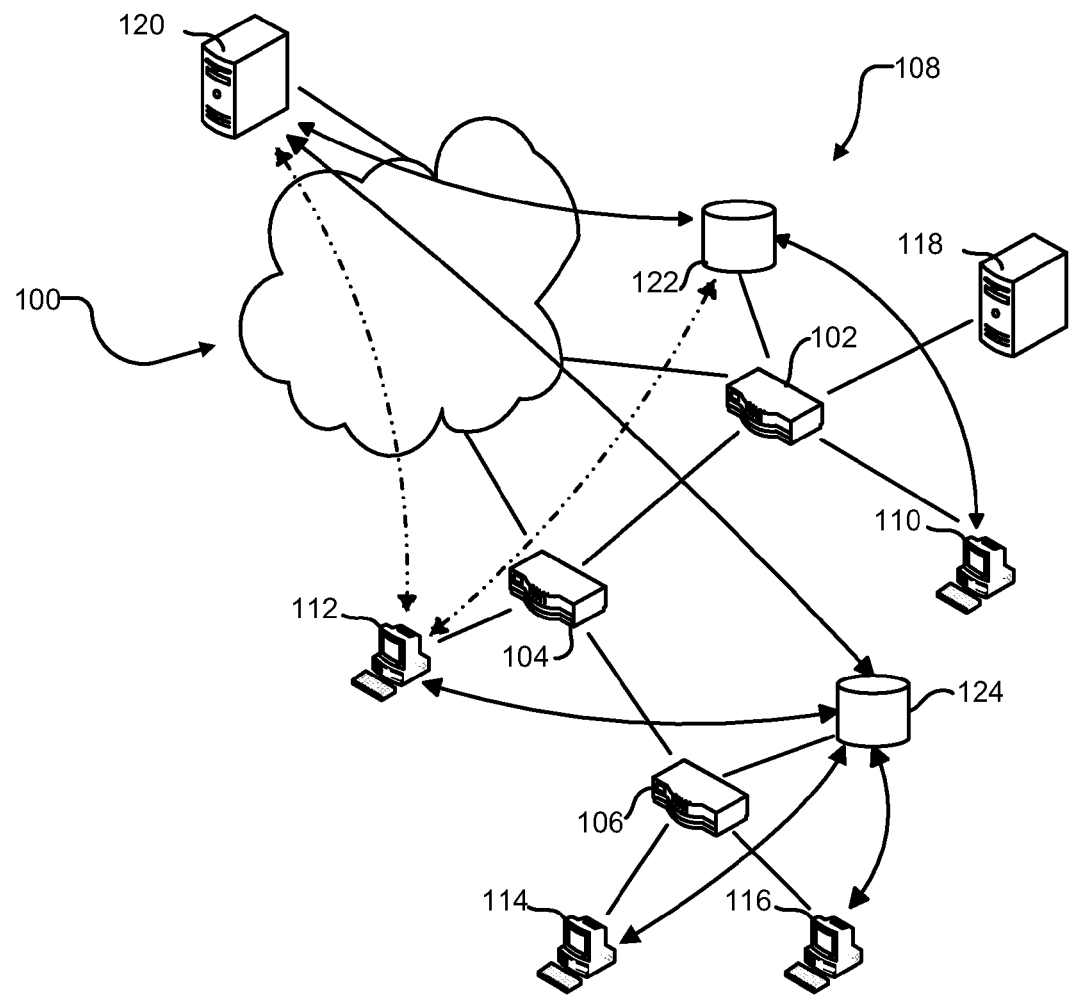
FIG. 1 is a block diagram illustrating a communications network in accordance with an embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphics, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include cache servers 122 and 124 that replicate content on the server 120 and that can be located more closely within the network to the client systems 110, 112, 114, and 116. Cache server 122 can link to router 102, and cache server 124 can link to router 106. Client systems 110, 112, 114, and 116 can be assigned cache server 122 or 124 to decrease the time needed to retrieve information, such as by selecting the cache server closer to the particular client system. The network distance between a cache server and client system can be determined by network cost and access time. As such, the effective network distance between the cache server and the client system may be different from the geographic distance.

When assigning cache servers 122 and 124 to client systems 110, 112, 114, and 116, the cache server closest to the client can be selected. The closest cache server may be the cache server having a shortest network distance, a lowest network cost, a lowest network latency, a highest link capacity, or any combination thereof. Client system 110 can be assigned cache server 122, and client systems 114 and 116 can be assigned to cache server 124. The network costs of assigning client system 112 to either of cache server 122 or 124 may be substantially identical. When the network costs associated with the link between router 102 and router 104 are marginally lower than the network costs associated with the link between router 104 and router 106, client 112 may be assigned to cache server 124.

Client system 112 may send a request for information to cache server 124. If cache server 124 has the information stored in a cache, it can provide the information to client system 112. This can decrease the distance the information travels and reduce the time to retrieve the information. Alternatively, when cache server 124 does not have the information, it can retrieve the information from server 120 prior to providing the information to the client system 112. In an embodiment, cache server 124 may attempt to retrieve the information from cache server 122 prior to retrieving the information from server 120. The cache server 124 may retrieve the information from the server 120 only once, reducing the load on server 120 and network 100 such as, for example, when client system 114 requests the same information.

Cache server 124 can have a cache of a limited size. The addition of new content to the cache may require old content to be removed from the cache. The cache may utilize a least recently used (LRU) policy, a least frequently used (LFU) policy, or another cache policy known in the art. When the addition of relatively cold or less popular content to the cache causes relatively hot or more popular content to be removed from the cache, an additional request for the relatively hot content can increase the time required to provide the relatively hot content to the client system, such as client system 114. To maximize the cost and time savings of providing content from the cache, the most popular content may be stored in the cache, while less popular content is retrieved from server 120.

Figure 2:
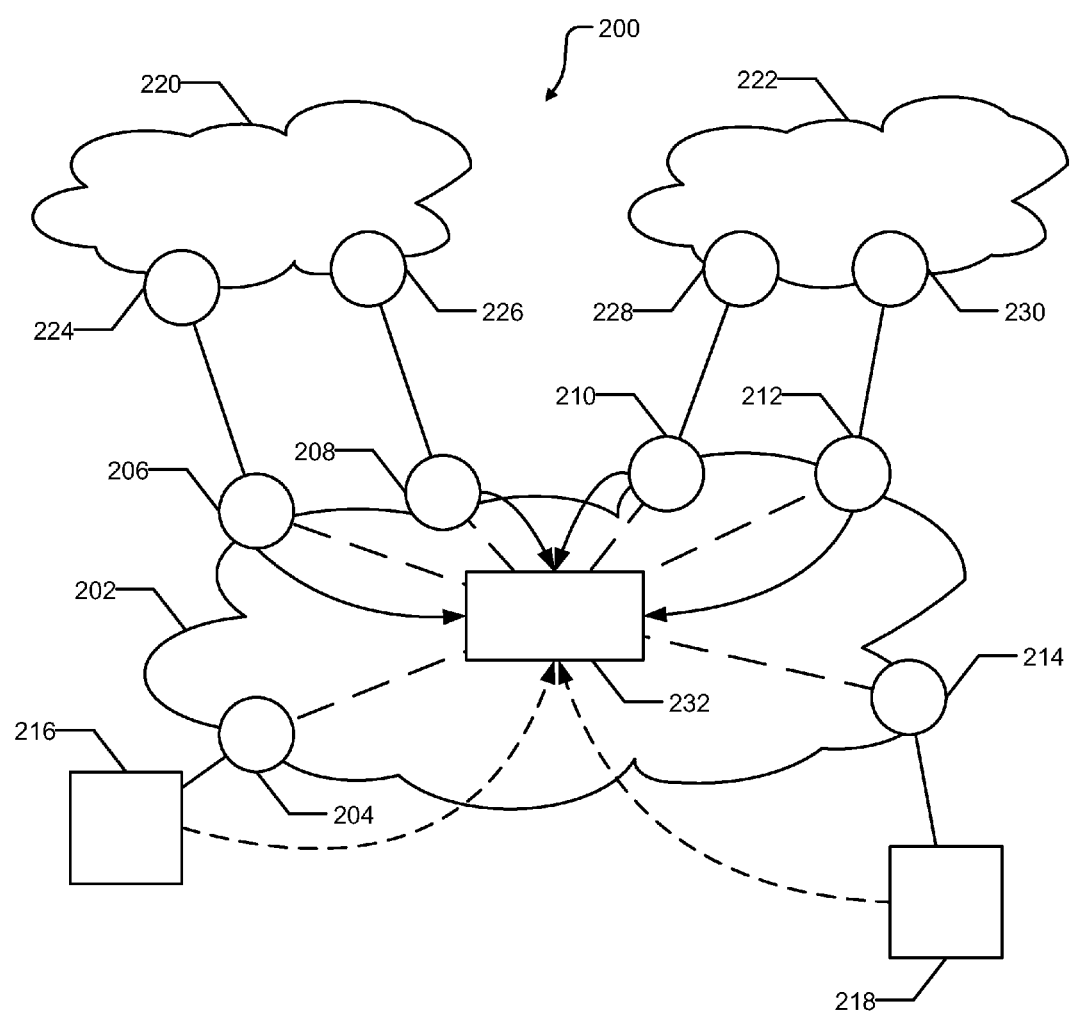
FIG. 2 is a block diagram illustrating an anycast CDN system in accordance with an embodiment of the present disclosure.

FIG. 2 illustrates an anycast CDN system 200 that can be used in conjunction with communications network 100. The anycast CDN system 200 can include a CDN provider network 202. The CDN provider network 202 can include a plurality of provider edge routers 204, 206, 208, 210, 212, and 214. The provider edge routers 204, 206, 208, 210, 212, and 214 can serve as ingress points for traffic destined for the CDN provider network 202, and egress points for traffic from the CDN provider network 202 destined for the rest of the Internet. The anycast CDN system 200 can further include cache servers 216 and 218. Cache server 216 can receive traffic from the CDN provider network 202 through provider edge router 204, and cache server 218 can receive traffic from the CDN provider network 202 through edge cache router 214. In addition to providing CDN service to clients within the CDN provider network, the anycast CDN system 200 can provide CDN service to clients within AS 220 and AS 222. AS 220 can include provider edge routers 224 and 226 with peering connections to provider edge routers 206 and 208, respectively. Similarly, AS 222 can include provider edge routers 228 and 230 with peering connections to provider edge routers 210 and 212 respectively. Requests for content from systems within either AS 220 or AS 222 may enter the CDN provider network through the appropriate peering points and be directed to either cache server 216 or 218.

Anycast CDN system 200 can also include a route controller 232. The route controller 232 can exchange routes with provider edge routers 206, 208, 210, and 212 within the CDN provider network 202. As such, the route controller 232 can influence the routes selected by the provider edge routers 206, 208, 210, and 212. Additionally, the route controller 232 can receive load information from cache servers 216 and 218. The load information can include available bandwidth, bandwidth utilization, CPU utilization, memory utilization, number of requests being served, and the like.

Cache servers 216 and 218 can advertise, such as through Border Gateway Protocol (BGP), a shared anycast address to the CDN provider network 202, specifically to provider edge routers 204 and 214. Provider edge routers 204 and 214 can advertise the anycast address to the route controller 232. The route controller 232 can provide a route to the anycast address to each of the provider edge routers 206, 208, 210, and 212. Provider edge routers 206, 208, 210, and 212 can direct traffic addressed to the anycast address to either of the cache servers 216 and 218 based on the routes provided by the route controller 232. Additionally, the provider edge routers 206, 208, 210, and 212 can advertise the anycast address to AS 220 and to AS 222. The route controller 232 can manipulate the route provided to provider edge routers 206, 208, 210, and 212 based on the load on the cache servers 216 and 218, network bandwidth, network cost, network distance, or any combination thereof. Altering the route to the anycast address can change which of cache servers 216 and 218 serve content to client systems within the CDN provider network 202, AS 220, and AS 222.

In an embodiment, AS 220 may be an unstable network. Traffic from client systems within the AS 220 may enter the CDN provider network 202 at both provider edge routers 206 and 208. Anycast traffic entering the CDN provider network 202 at provider edge router 206 may be directed to cache server 216 while anycast traffic entering at provider edge router 208 may be directed to cache server 218. Internal routing changes within AS 220 can cause traffic from a client system within AS 220 to be shifted from cache server 216 to cache server 218, resulting in disruptions to persistent and/or secure connections. As such, it is undesirable to provide an anycast addresses to client systems within an unstable network that can be subjected to frequent internal routing changes.

Figure 3:
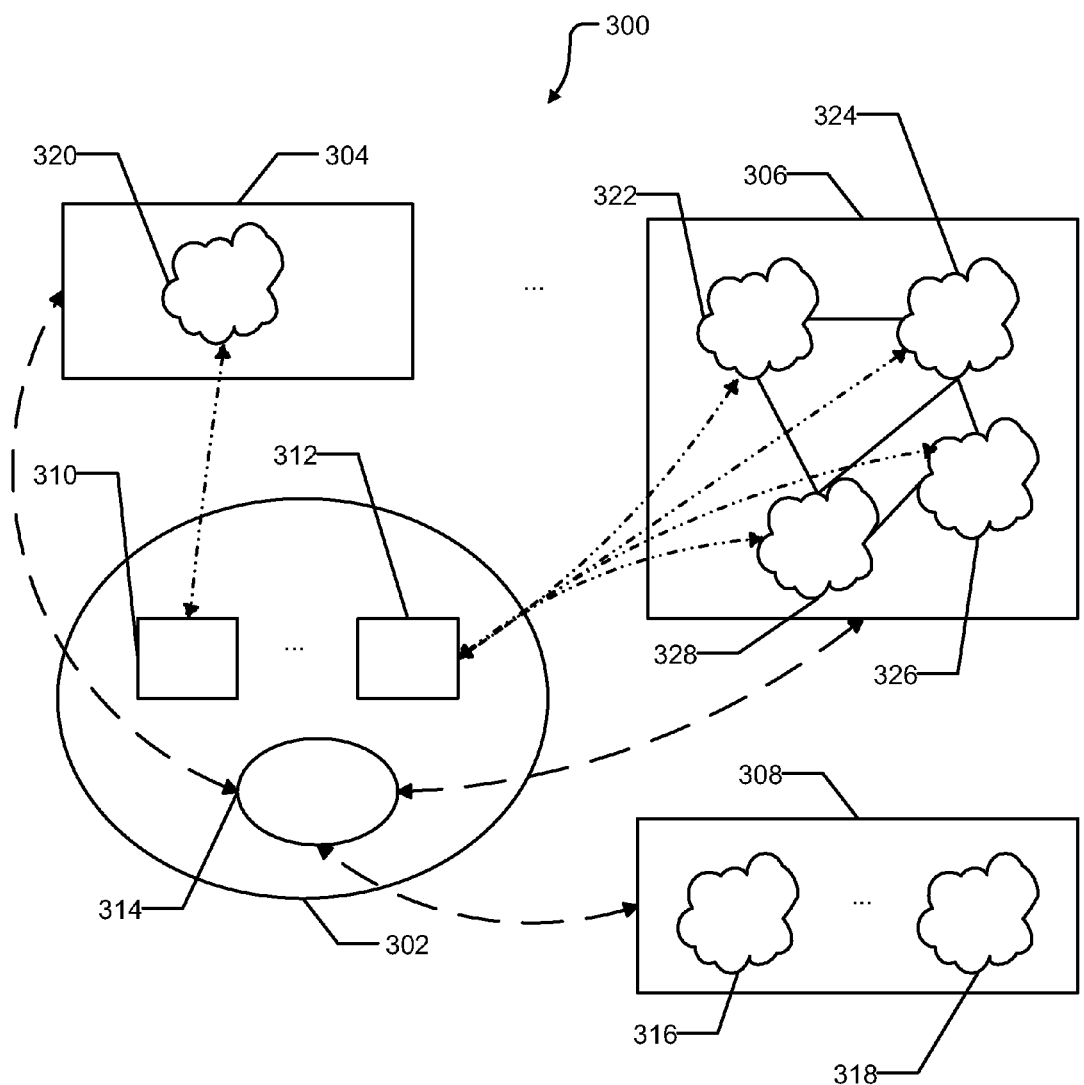
FIG. 3 is a block diagram illustrating another anycast CDN system in accordance with an embodiment of the present disclosure.

FIG. 3 illustrates another exemplary CDN system 300 that can be used in conjunction with communications network 100. The CDN system 300 can include an anycast CDN control module 302, an anycast island 304, an anycast island 306, and a DNS island 308. Anycast CDN control module 302 can include an anycast island controller 310, an anycast island controller 312 and an authoritative DNS server 314. Anycast island controller 310 can coordinate load balancing within anycast island 304. Similarly, anycast island controller 312 can coordinate load-balancing within anycast island 306. Authoritative DNS server 314 can provide address resolution for domains serviced by CDN network 300.

DNS island 308 can include ASes 316 and 318. ASes 316 and 318 can be Type I ASes. Type I ASes can offer hosting services for cache servers. However, Type I ASes may not provide load-balancing for CDN traffic. Load-balancing for cache servers within Type I ASes can be performed by anycast CDN control module 302.

In an embodiment, anycast CDN control module 302 can receive load information from cache servers located within ASes 316 and 318. The load information can include CPU utilization, memory utilization, number of concurrent requests being served, amount of available bandwidth, or the like. The anycast CDN control module 302 can determine a load balancing plan based on the load information and the location of the cache servers within the network. Authoritative DNS server 314 can provide unicast addresses to client systems within ASes 316 and 318. The unicast addresses can direct client systems to particular cache servers located within the ASes 316 and 318 or within a backbone network according to the load balancing plan. Additionally, authoritative DNS server 314 can provide an anycast address corresponding to cache servers located within a backbone network.

Anycast island 304 can include AS 320. AS 320 can be a Type II AS. A Type II AS can offer hosting services for cache servers of CDN system 300 and can handle load balancing among all cache servers hosted by the Type II AS. AS 320 can attempt to ensure that there will be no overloaded cache servers within AS 320 provided that the overall load within AS 320 is less than the aggregate capacity of the cache servers within AS 320. Specifically, AS 320 can control the routing within AS 320 in order to direct requests away from overloaded cache servers to cache servers with spare capacity. AS 320 can prevent cases where one cache server is overloaded, for example having a load greater than about 80%, while another cache server within AS 320 has spare capacity, such as a load of about 20%.

In an embodiment, anycast island controller 310 can collect load information from cache servers hosted by AS 320. The load information can include CPU utilization, memory utilization, number of concurrent requests being served, amount of available bandwidth, or the like. Anycast island controller 310 can provide the load information to AS 320 to enable AS 320 to provide load balancing for the cache servers hosted by AS 320. Additionally, anycast island controller 310 can determine when the aggregate load from AS 320 exceeds the aggregate capacity of the cache servers within AS 320, and cause a portion of the requests to be diverted to a cache server located outside of AS 320. Further, anycast island controller 310 can utilize the load information to verify that AS 320 is providing satisfactory load-balancing for the cache servers. Anycast island controller 310 can also notify AS 320 of a failure to provide satisfactory load balancing for the cache servers.

In an embodiment, DNS server 314 can provide an anycast address in response to requests from AS 320. The anycast address can direct client systems to cache servers located within AS 320. The anycast address can be specific to the cache servers located within AS 320. If the aggregate demand from client systems within AS 320 exceeds the aggregate capacity of the cache servers within AS 320, the authoritative DNS server 314 can redirect a portion of the request to a cache server located outside of the AS 320. For example, the DNS server 314 can provide a unicast address directing client systems to a cache server within a backbone network or within an alternate AS. In another example, authoritative DNS server 314 can provide an alternate anycast address to a portion of the client system within AS 320. The alternate anycast address can direct requests to cache servers located within another AS or within the backbone network in order to shift excess requests to cache servers located outside of AS 320.

Anycast island 306 can include ASes 322, 324, 326, and 328. ASes 322, 324, 326, and 328 can be Type III ASes. A Type III AS can provide hosting services for cache servers, load balancing across cache servers within the AS, and direct requests to another Type III AS within the same anycast island. Load balancing between Type II ASes can be under the direction of anycast CDN controller 302. For example, anycast island controller 312 can instruct AS 322 to shift an amount of traffic to AS 324. AS 320 can redirect the amount of traffic to AS 324.

In an embodiment, anycast island controller 312 can collect load information from cache servers hosted by ASes 322, 324, 326, and 328. The load information can include CPU utilization, memory utilization, number of concurrent requests being served, amount of available bandwidth, or the like. Anycast island controller 312 can provide the load information to ASes 322, 324, 326, and 328 to enable those ASes to provide load balancing for cache servers hosted by AS 322, 324, 326, and 328, respectively. Additionally, anycast island controller 312 can utilize the load information to provide load balancing among ASes 322, 324, 326, and 328. Specifically, anycast island controller 312 can utilize the load information to identify ASes exceeding their aggregate capacity. Anycast island controller 312 can direct an overloaded AS to divert a portion of the load to an AS with excess capacity within anycast island 306. Further, anycast island controller 312 can utilize its load information to verify that ASes 322, 324, 326, and 328 are providing satisfactory load-balancing among cache servers within each AS and diverting requests to another AS as directed by anycast island controller 312. In the event that one of ASes 322, 324, 326, and 328 is not providing adequate load-balancing within the AS or shifting requests to another AS as directed, anycast island controller 312 can notify the corresponding AS of the failure so that the AS can take steps to reconcile the issue.

In an embodiment, authoritative DNS server 314 can provide an anycast address corresponding to the cache servers hosted by ASes 322, 324, 326, and 328. Authoritative DNS server 314 can provide the same anycast address for all request from anycast island 306. Alternatively, authoritative DNS server 314 can provide anycast addresses that are unique to each of ASes 322, 324, 326, and 328. Each of ASes 322, 324, 326, and 328 can control routing within the respective ASes to direct requests sent to the anycast address to an appropriate cache server hosted by the AS. If the demand from client systems within anycast island 306 exceeds the aggregate capacity of the cache servers hosted by AS 322, 324, 326, and 328, anycast CDN control module 302 can redirect a portion of the requests to cache servers located outside of anycast island 306. For example, authoritative DNS server 314 can provide a unicast address directing a portion of the client systems to a cache server within the backbone network or within an alternate AS outside of anycast island 306. In another example, authoritative DNS server 314 can provide an alternate anycast address to a portion of client systems within ASes 322, 324, 326, and 328. The alternate anycast address can direct requests to cache servers located outside of anycast island 306, such as within another AS or within the backbone network.

Figure 4:
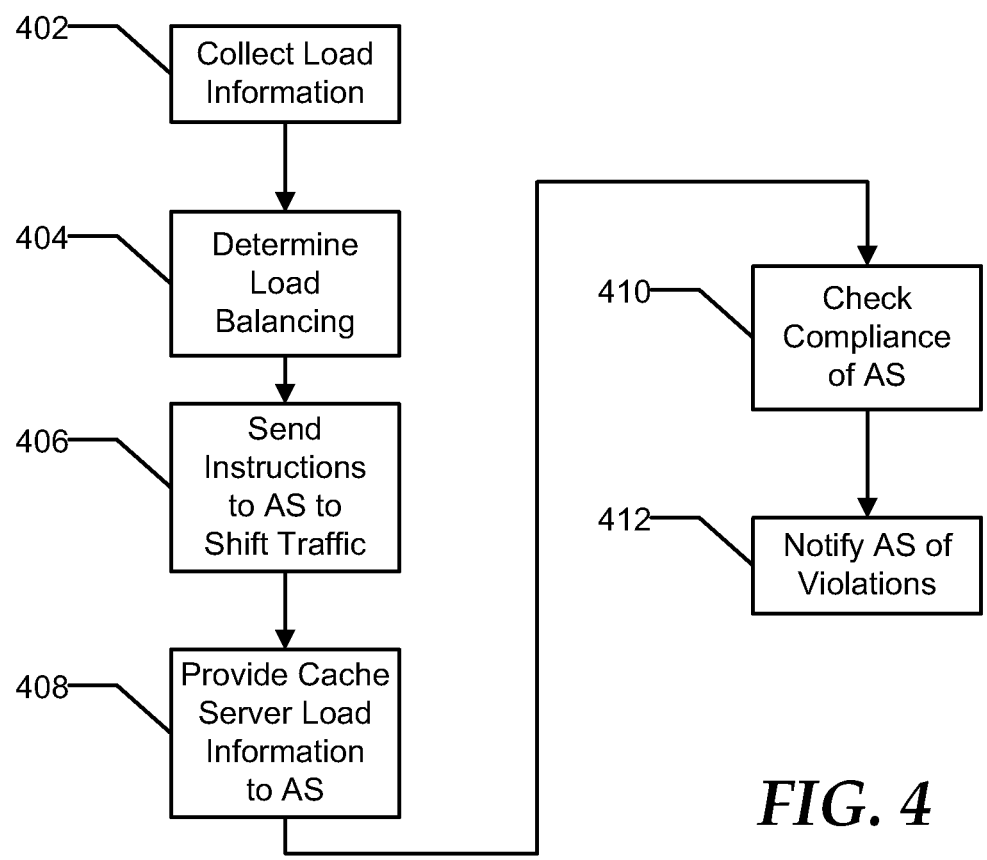
FIG. 4 is a flow diagram illustrating an exemplary method of controlling Type III ASes in accordance with an embodiment of the present disclosure.

FIG. 4 illustrates a flow diagram of a method for controlling Type III ASes. At 402, an anycast island controller, such as anycast island controller 312, can collect load information from cache servers hosted by a Type III AS. The load information can include CPU utilization, memory utilization, number of concurrent requests being served, amount of available bandwidth, or the like. At 404, the anycast island controller can determine an optimal load balancing for requests within the anycast island. Specifically, the anycast island controller can determine the amount of traffic to be shifted between Type III ASes within the anycast island. At 406, the anycast island controller can send instructions to the Type III ASes to shift traffic. Specifically, the anycast island controller can instruct a Type III AS to shift an amount of traffic to another Type III AS within the anycast island. At 408, the anycast island controller can provide cache server load information to the ASes. The ASes can use the cache server load information to perform load balancing among multiple cache servers located within the AS, such as by controlling the routing of requests sent to an anycast address to direct requests away from overloaded cache servers and towards cache servers with available capacity.

At 410, the anycast island controller can determine the compliance of each AS. For example, the anycast island controller can determine if the correct amount of traffic is shifted to the correct AS. Additionally the anycast island controller can determine if traffic within an AS is adequately balanced among the cache servers within the AS. Specifically, the anycast island controller can determine if there is a cache server with significant excess capacity and a critically overloaded cache server within the same Type III AS. At 412, the anycast island controller can notify the AS of violations, such as a failure to adequately load balance within the AS, a failure to shift a correct amount of traffic outside of the AS, or a failure to shift the traffic to a correct alternate AS. The AS can utilize the information to correct the violations.

Figure 5:
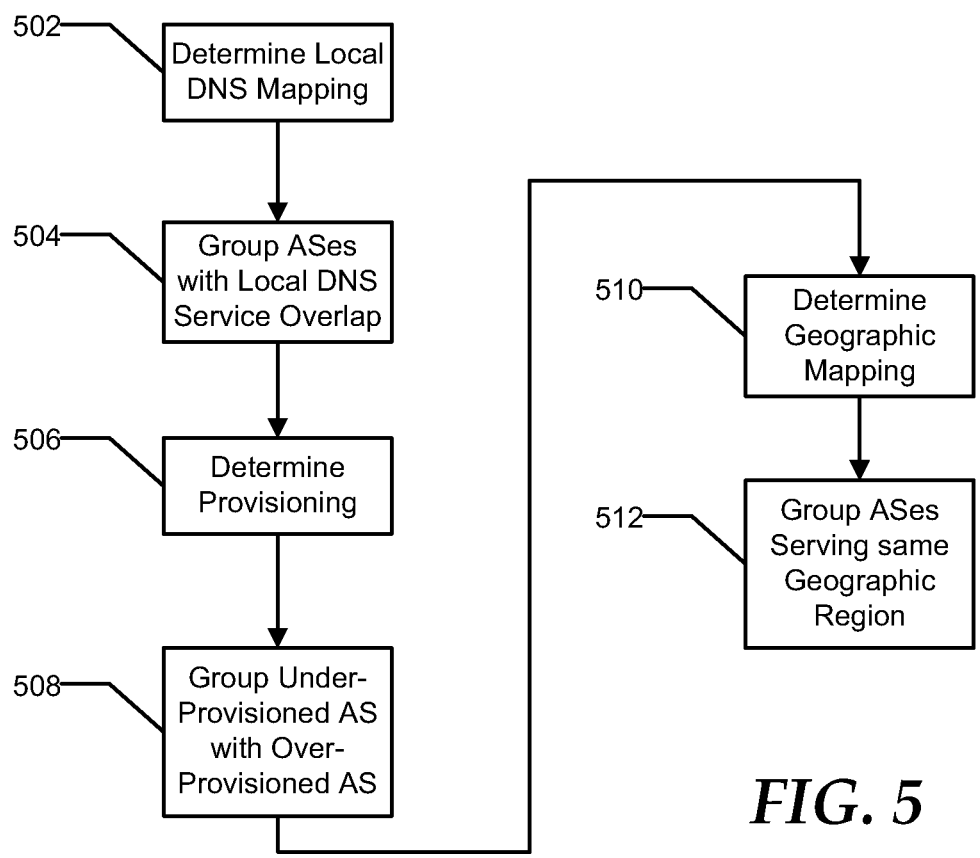
FIG. 5 is a flow diagram illustrating an exemplary method of grouping Type III ASes into an anycast island in accordance with an embodiment of the present disclosure.

FIG. 5 is a flow diagram illustrating a method for clustering Type III ASes into an anycast island. At 502, an island mapping module can determine a local DNS service mapping for the Type III ASes. The local DNS mapping can identify the local DNS servers utilized by client systems within each AS. At 504, the island mapping module can group ASes with overlapping local DNS service into the same anycast island. Local DNS service overlap can occur between two ASes when client systems within each AS request DNS address resolution from the same local DNS server. When there is overlap, the authoritative DNS server for the content delivery system may be unable to distinguish between client systems within two ASes.

At 506, the island mapping module can determine provisioning levels for each of the type III ASes. Specifically, the island mapping module can identify ASes that are under provisioned, that is there are insufficient cache servers within the AS to satisfy a typical local load. Additionally, the island mapping module can identify ASes that are over provisioned, that is there is an excess of cache servers for satisfying the typical local load. At 508, the island mapping module can group an under-provisioned AS with an over-provisioned AS. Preferably, the typical aggregate load of the ASes within an anycast island can be not greater than the aggregate capacity of the cache servers within the anycast island.

At 510, the island mapping module can determine a geographic mapping for the Type III ASes. That is, the island mapping module can determine which geographic regions are covered by each of the ASes. At 512, the island mapping module can group ASes serving the same region. For example, two Internet Service Providers (ISPs) within the same city can have ASes that serve the same geographic region. The two ASes may be grouped into the same anycast island to take advantage of the proximity of the client systems to cache servers within the same geographic region.

Figure 6:
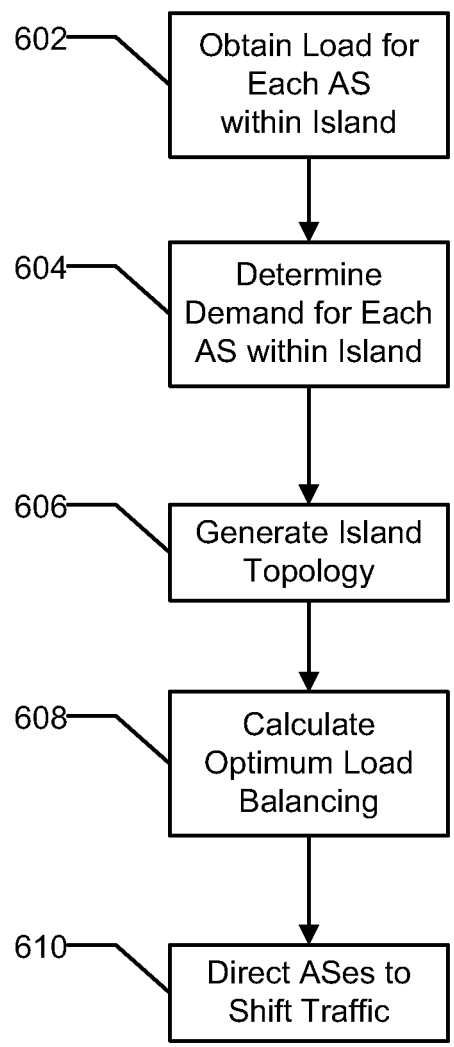
FIG. 6 is a flow diagram illustrating an exemplary method of balancing loads among Type III ASes within an anycast island in accordance with an embodiment of the present disclosure.

FIG. 6 is a flow diagram illustrating an exemplary method of balancing load among Type III ASes within an anycast island, such as anycast island 306. At 602, an anycast island controller, such as anycast island controller 312, can obtain the present aggregate load for each AS within the anycast island. The present aggregate load for an AS can be the sum of the loads of each cache server hosted by the AS. At 604, the anycast island controller can determine the present demand for each AS. A present locally served local demand can equal the present aggregate load minus the sum of the demands shifted from other ASes within the anycast island. The demands shifted from other ASes can be the demand that the anycast island controller instructed the other ASes to shift to the present AS in the previous interval. The present demand for the AS can be the sum of the locally served local demand and the demands shifted to other ASes by the AS. The demands shifted to other ASes can correspond to the demand that the anycast island controller instructed the AS to shift in the previous interval.

At 606, the anycast island controller can generate an island topology for the anycast island. Within the island topology, each node can correspond to an AS, and each node can be weighted with the present demand of AS minus the aggregate capacity of the AS (demand-capacity). The aggregate capacity can be the sum of the capacities of the cache servers hosted by the AS. ASes with a positive demand-capacity can be overloaded, that is at least a portion of the local load cannot be served locally. ASes with a negative demand-capacity can have spare capacity, that is the cache servers hosted by the AS can have spare capacity after serving all of the local demand. Edges can exist between any two ASes that have agreed to shift demand between them. Each edge can be weighted based on the network cost for shifting demand between the ASes, the network distance between the ASes, or any combination thereof. Additionally, each edge can have a limit to the amount of demand that can be shifted between the ASes.

At 608, the anycast island controller can calculate an optimum load balancing. The optimum load balancing is the load balancing that shifts demand from demand sources, that is, ASes with positive demand-capacity, to demand sinks, that is ASes with negative demand-capacity, with the lowest cost without exceeding the limits to demand shifted between any two ASes. The optimum load balancing can be determined according to a multi-source, multi-sink minimum-cost flow algorithm. At 610, the anycast island controller can direct the ASes to shift traffic according to the optimum load balancing for the present interval.

Additionally, the anycast island controller can avoid transient loops. Transient loops can be loops formed in the traffic shifting due to delays in implementing the present traffic shifting. For example, if in the previous interval traffic was shifted from A to B and from C to D, and in the present interval traffic is shifted from B to C and from D to A, a transient loop (A→B→C→D→A) can be formed if B and D begin shifting traffic before A and C stop shifting traffic. To avoid transient loop formation, the anycast island controller can wait for A and C to stop shifting traffic prior to instructing B and D to begin shifting traffic.

Figure 7:
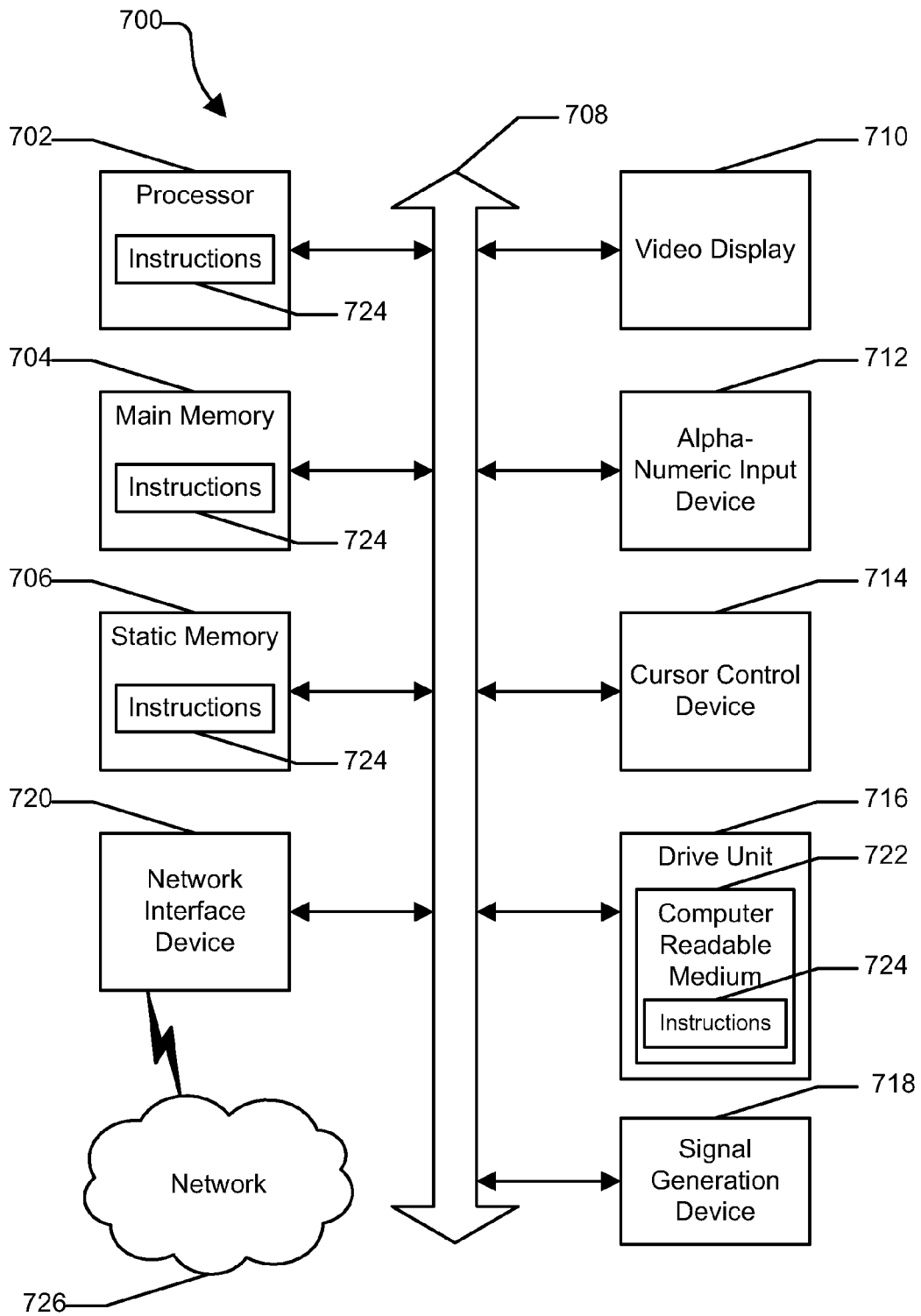
FIG. 7 is an illustrative embodiment of a general computer system.

FIG. 7 shows an illustrative embodiment of a general computer system 700. The computer system 700 can include a set of instructions that can be executed to cause the computer system to perform any one or more of the methods or computer based functions disclosed herein. The computer system 700 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, such as a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710 such as a liquid crystal display (LCD), an organic light emitting diode (OLED), a flat panel display, a solid-state display, or a cathode ray tube (CRT). Additionally, the computer system 700 may include an input device 712 such as a keyboard, and a cursor control device 714 such as a mouse. Alternatively, input device 712 and cursor control device 714 can be combined in a touchpad or touch sensitive screen. The computer system 700 can also include a disk drive unit 716, a signal generation device 718 such as a speaker or remote control, and a network interface device 720 to communicate with a network 726. In a particular embodiment, the disk drive unit 716 may include a computer-readable medium 722 in which one or more sets of instructions 724, such as software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

The previously discussed modules can be implemented in hardware, software, or any combination thereof. Each module may include one or more computer systems. When a module includes more than one computer system, the functions of the module can be distributed across the multiple computer systems in a symmetric manner, i.e., each computer system performs the same type of tasks, or in an asymmetric manner, i.e., two computer systems of the module may perform different tasks.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A content delivery network comprising:
   a first set of cache servers hosted by a first autonomous system and a second set of cache servers hosted by a second autonomous system, wherein the first autonomous system balances a first load among the first set of cache servers by controlling routing within the first autonomous system and the second autonomous system balances a second load among the second set of cache servers by controlling routing within the second autonomous system, wherein each of the cache servers performs operations comprising:
      responding to an anycast address for the content delivery network; and
      receiving a request for content from a client system and providing the content to the client system;
   a domain name server that performs operations comprising:
      receiving a request for a cache server address; and
      providing the anycast address in response to the request for the cache server address; and
   an anycast island controller separate from the first autonomous system, which performs operations comprising:
      receiving load information from the first set and the second set of cache servers;
      generating an island topology for an anycast island serviced by the anycast island controller, wherein the island topology includes weights for each node in the first autonomous system, wherein the weights are based on a difference between a present demand for the first autonomous system and a first aggregate capacity of the first set of cache servers;
      identifying, based on the island topology, when a first aggregate load for the first autonomous system exceeds the first aggregate capacity of the first set of cache servers and a second aggregate load for the second autonomous system is below a second aggregate capacity of the second set of cache servers;
      determining an amount of requests for content to transfer from the first autonomous system to the second autonomous system in response to the identifying;
      preventing a transient loop from forming in the first autonomous system and the second autonomous system prior to sending an instruction to the first autonomous system to control the routing of the anycast address to transfer the amount of requests for content to the second autonomous system, wherein the transient loop is prevented, at least in part, by waiting for devices shifting traffic associated with the amount of requests to stop shifting the traffic; and sending the instruction to the first autonomous system to control the routing of the anycast address to transfer the amount of requests for content to the second autonomous system after the transient loop is prevented.

2. The content delivery network of claim 1, further comprising a third set of cache servers hosted by a third autonomous system, wherein the third autonomous system performs operations comprising balancing a third load among the third set of cache servers, wherein the anycast island further performs operations comprising determining a second amount of requests for content to transfer from the first autonomous system to the third autonomous system and sending an instruction to the first autonomous system to transfer the second amount of requests for content to the third autonomous system.

3. The content delivery network of claim 1, wherein the domain name server further performs operations comprising:
receiving a second request for a cache server address; and
providing a unicast address in response to a second request for a cache server address, the unicast address corresponding to an available cache server.

4. The content delivery network of claim 1, wherein the anycast island controller further performs operations comprising determining if a critically overloaded cache server and a cache server with a significant excess capacity are within the first autonomous system.

5. The content delivery network of claim 4, wherein the anycast island controller further performs operations comprising notifying the first autonomous system when a critically overloaded cache server and a cache server with a significant excess capacity are within the first autonomous system.

6. The content delivery network of claim 1, wherein the anycast island controller further performs operations comprising verifying the amount of requests shifted from the first autonomous system to the second autonomous system.

7. The content delivery network of claim 6, wherein the anycast island controller further performs operations comprising notifying the first autonomous system of a failure to shift the amount of requests to the second autonomous system.

8. The content delivery network of claim 1, wherein the load information includes one of network bandwidth, central processing unit utilization, memory utilization, and number of requests being served.

9. The content delivery network of claim 1, wherein the first autonomous system balances the load across the first set of cache servers by controlling the routing of the anycast address within the first autonomous system.

10. An anycast island controller comprising:
a memory that stores instructions;
a processor that executes the instructions to performing operations comprising:
receiving load information from a first set of cache servers hosted by a first autonomous system and a second set of cache servers hosted by a second autonomous system, the first autonomous system configured to balance a first load among the first set of cache servers and the second autonomous systems configured to balance a second load among the second set of cache servers;

generating an island topology for an anycast island serviced by the anycast island controller, wherein the island topology includes weights for each node in the first autonomous system, wherein the weights are based on a difference between a present demand for the first autonomous system and a first aggregate capacity of the first set of cache servers;

identifying, based on the island topology, when a first aggregate load for the first autonomous system exceeds the first aggregate capacity of the first set of cache servers and a second aggregate load for the second autonomous system is below a second aggregate capacity of the second set of cache servers;

determining an amount of requests to transfer from the first autonomous system to the second autonomous system in response to the identifying;

preventing a transient loop from forming in the first autonomous system and the second autonomous system prior to sending an instruction to the first autonomous system to control the routing of the anycast address to transfer the amount of requests for content to the second autonomous system, wherein the transient loop is prevented, at least in part, by waiting for devices shifting traffic associated with the amount of requests to stop shifting the traffic; and sending the instruction to the first autonomous system to control the routing of the anycast address to transfer the amount of requests to the second autonomous system after the transient loop is prevented.

11. The anycast island controller of claim 10, wherein the operations further comprise determining if a critically overloaded cache server and a cache server with a significant excess capacity are within the first autonomous system.

12. The anycast island controller of claim 11, wherein the operations further comprise notifying the first autonomous system when a critically overloaded cache server and a cache server with a significant excess capacity are within the first autonomous system.

13. The anycast island controller of claim 10, wherein the operations further comprise verifying the amount of requests shifted from the first autonomous system to the second autonomous system.

14. The anycast island controller of claim 13, wherein the operations further comprise notifying the first autonomous system of a failure to shift the amount of requests to the second autonomous system.

15. A computer readable device comprising a plurality of instructions to manipulate a processor to cause the processor to perform operations comprising:
receiving load information from a first set of cache servers hosted by a first autonomous system and a second set of cache servers hosted by a second autonomous system, the first autonomous system configured to balance a first load among the first set of cache servers and the second autonomous systems configured to balance a second load among the second set of cache servers;

generating an island topology for an anycast island associated with the first and second autonomous systems, wherein the island topology includes weights for each node in the first autonomous system, wherein the weights are based on a difference between a present demand for the first autonomous system and a first aggregate capacity of the first set of cache servers;

identifying, based on the island topology, when a first aggregate load for the first autonomous system exceeds the first aggregate capacity of the first set of cache servers and a second aggregate load for the second autonomous system is below a second aggregate capacity of the second set of cache servers;

determining an amount of requests to transfer from the first autonomous system to the second autonomous system when the first aggregate load exceeds the first aggregate capacity and the second aggregate load is below the second aggregate capacity;

preventing a transient loop from forming in the first autonomous system and the second autonomous system prior to sending an instruction to the first autonomous system to control the routing of the anycast address to transfer the amount of requests for content to the second autonomous system, wherein the transient loop is prevented, at least in part, by waiting for devices shifting traffic associated with the amount of requests to stop shifting the traffic; and sending the instruction to the first autonomous system to controlling the routing of the anycast address to transfer the amount of requests to the second autonomous system after the transient loop is prevented.

16. The computer readable device of claim 15, wherein the operations further comprise determining if a critically overloaded cache server and a cache server with a significant excess capacity are within the first autonomous system.

17. The computer readable device of claim 16, wherein the operations further comprise notifying the first autonomous system when a critically overloaded cache server and a cache server with a significant excess capacity are within the first autonomous system.

18. The computer readable device of claim 15, wherein the operations further comprise verifying the amount of requests shifted from the first autonomous system to the second autonomous system.

19. The computer readable device of claim 15, wherein the operations further comprise notifying the first autonomous system of a failure to shift the amount of requests to the second autonomous system.

20. The content delivery network of claim 1, wherein
the first and second autonomous systems are within the anycast island;
the anycast island controller determines if an aggregate load of the anycast island exceeds an aggregate capacity of cache servers within the anycast island; and
the domain name server provides a unicast address to a portion of the client systems within the anycast island to direct requests to cache servers located outside of the anycast island when the aggregate load exceeds the aggregate capacity.

\* \* \* \* \*